May 14, 1968  C. W. HAHL ET AL  3,382,651

AIR CLEANER

Filed April 22, 1966

INVENTOR.
CHARLES W. HAHL
JESSE R. BROWN
BY
Christie, Parker & Hale
ATTORNEYS 3,382,651
AIR CLEANER
Charles W. Hahl and Jesse R. Brown, Pomona, Calif., assignors to Vortox Mfg. Company, Claremont, Calif., a corporation of California
Filed Apr. 22, 1966, Ser. No. 544,571
1 Claim. (Cl. 55—337)

ABSTRACT OF THE DISCLOSURE

A dry air filter enclosed in a housing in spaced relationship from its inner wall to define an annular passage. A support holds one end of the filter in spaced relationship with the inner end wall of the housing to define a disc-shaped chamber therewith that communicates with the annular passage. A cap covers said one end of the filter to prevent air passage therethrough. A dust receptacle communicates with the disc-shaped chamber to provide a point for removal of centrifugally separated dust particles. An air intake located near the opposite end of the housing from the disc-shaped chamber directs air into a spiral path swirling around the annular passage toward the disc-shaped chamber.

---

Figure 1:
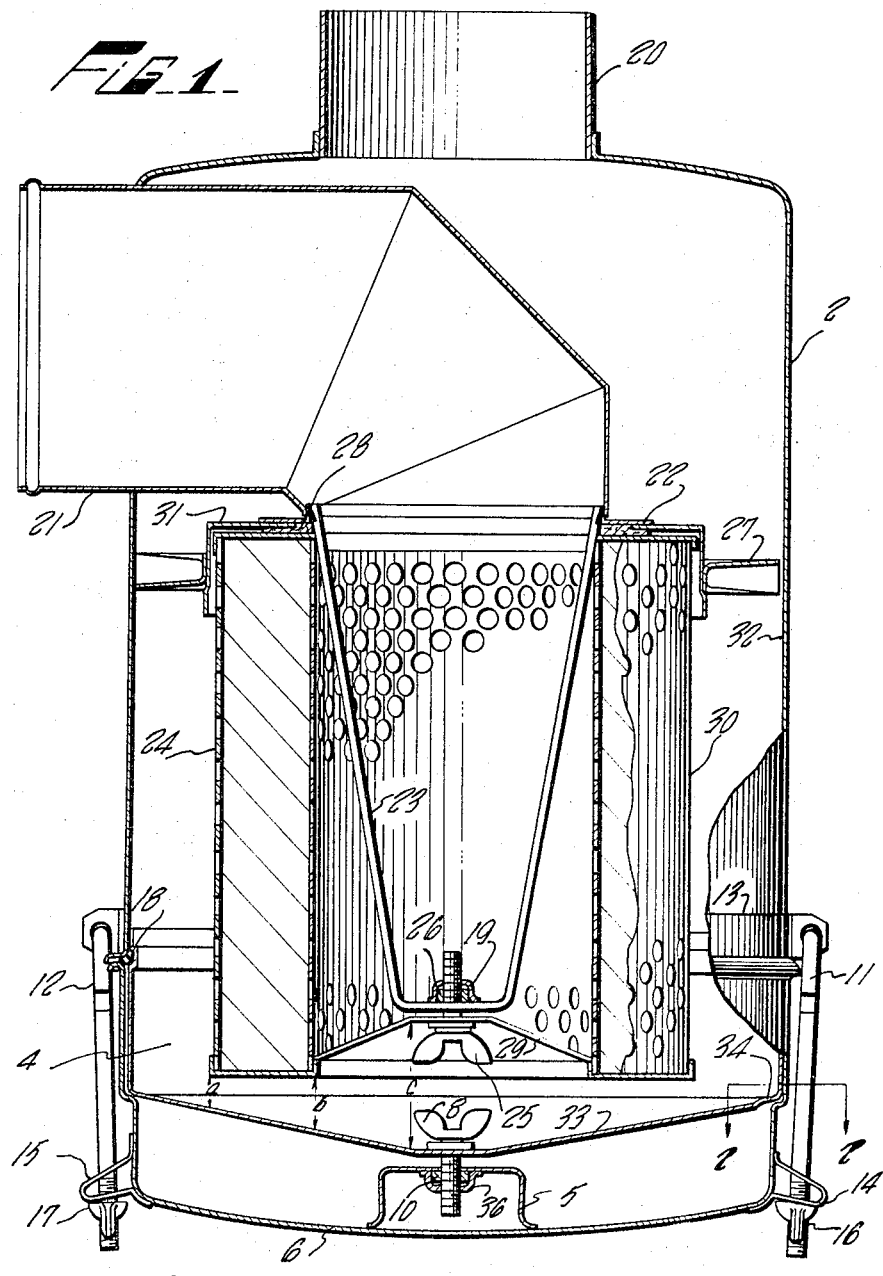

This invention relates to air cleaners, and more specifically, to an air cleaner of the type, in which separation of dust by centrifugal force and by filtering both take place within one housing.

Typical of the type of air cleaner, in which the functions of separation of dust by centrifugal force and by filtering are both performed within one housing, is that disclosed in Patent 3,078,650 of Dale K. Anderson and William R. Wolff, issued Feb. 26, 1963. Such air cleaners are particularly adapted for use in the intake system of an internal combustion engine. A replaceable dry paper filter having a pervious cylindrical surface, through which the air to be filtered passes, is surrounded by a cylindrical housing with a larger diameter. The cylindrical surfaces of the housing and the filter define an annular passage, into which an air intake tube opens. An outlet tube, which is at a lower pressure than the intake tube, carries the filtered air to the engine manifold. A louvered ring situated in the annular passage in the path of air entering from the intake tube imparts to the incoming air a swirling, spiral motion. As the air swirls around the perimeter of the filter some of the dust particles, mostly the larger ones, are separated by centrifugal force and pass to a dust receptacle at the end of the housing. The rest of the dust is removed by the filter. Since a good deal of dust is separated by centrifugal force, the filter need not be replaced as often as otherwise.

The Anderson, et al. patent recognizes that as the air traveling in the annular passage spirals away from the intake tube toward the dust receptacle, its velocity progressively diminishes. Near the end of the annular passage at which the dust receptacle is located the centrifugal force exerted upon the dust particles is therefore greatly reduced. This tends to cause centrifugally separated dust particles about to pass to the receptacle to become entrained in air flowing radially inward to the filter. To combat this undesirable action, the Anderson et al. patent teaches using an annular baffle to surround an area of the end of the pervious cylindrical surface of the filter.

In contrast, according to the invention, an air cleaner is provided with a chamber, to which air in the passage swirling around the perimeter of the filter has free access. More specifically, the side perimeter surfaces of the housing and the filter define the passage, while one end surface of the filter and the end surface of the housing facing it define the chamber. Air introduced into the passage swirls around the side perimeter of the filter toward the end of the filter where the chamber is located. It has been found, that the chamber accounts for a marked increase in the velocity of the swirling air near the end of the passage. More effective separation of dust particles by centrifugal force therefore results. A more effective removal of dust particles by filtering also results, since the cause for entrainment of centrifugally separated dust at the end of the passage is in large measure eliminated.

Figure 2:
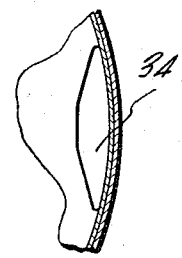

These and other features of the invention are considered further in the following detailed description of the invention taken in connection with the drawing, in which:

FIG. 1 is a side elevation view partially in section of an air cleaner constructed according to the invention, and FIG. 2 is a top view of the opening in the housing leading to the dust receptacle.

Reference is made to FIG. 1, in which a cylindrical housing is disclosed comprising a main body 2, a disc insert 4, and a dust receptacle cup 6. Disc 4 is fastened to cup 6 by means of a wing bolt assembly 8 including a resilient washer and a nut 10 fixed against rotation and held in place at the surface of cup 6 by a member 36 spot welded and soldered to a cap 5. The unit formed by cup 6 and disc 4 is fastened to main body 2 by two or more rod fastener assemblies such as rods 11 and 12 and brackets 14 and 15, respectively, provided with slots to accommodate the rod shanks. Rods 11 and 12 are terminated by wing nuts 16 and 17, respectively, and are connected to main body 2 by a band 13. An annular gasket 18 serves to seal the fitting between main body 2 and the unit formed by disc 4 and cup 6.

An intake tube 20 is connected to the top of main body 2. An outlet tube 21 is connected to the side wall and extends inside of main body 2. Inside of main body 2 outlet tube 21 terminates in an annular flange 22, to which a V-shaped bracket 23 is spot welded and soldered. The open end of a hollow, cylindrical dry paper air filter 24 of the conventional, commercially available type is held in abutment with flange 22 by bracket 23. A wing bolt assembly 25 including a resilient washer and a nut 26 fasten an imperforate end cap 29 of filter 24 to bracket 23. Nut 26 is fixed against rotation and held in place by a member 19 spot welded and soldered to the surface of bracket 23. An annular end portion 31 of a cylindrical skirt having an integral louvered ring 27 is sandwiched between flange 22 and an annular gasket 28, which maintains an airtight fitting between filter 24 and outlet tube 21. Side perimeter surface 30 of filter 24 is a perforate metal screen, through which air to be filtered passes to the filtering material. Surface 30 serves as the outer cylindrical filter wall of filter 24.

Filter 24, main body 2, and disc portion 4 are dimensioned so that side perimeter surface 30 of filter 24 and side perimeter surface 32 of main body 2 define an annular passage, in which air is capable of swirling along the side perimeter of filter 24. In addition, concave surface 33 of disc 4 and the surface of end cap 29 of filter 24 are spaced from one another to define a disc-shaped chamber open to the entire perimeter of the annular passage, so air in the annular passage swirling around the perimeter of filter 24 has free access to the disc-shaped chamber.

In operation, a low pressure exists in outlet tube 21, thus drawing air through intake tube 20. Air entering main body 2 from intake tube 20 passes through louvered ring 27, which directs the air into a spiral path swirling toward the other end of the annular passage. In the process some of the dust particles in the air, chiefly the larger particles, are separated by centrifugal force and removed through an opening or slot 34 (FIG. 2) in surface 33. Air swirling around side perimeter 30 is drawn into filter 24, in which the remaining dust is removed, and passes through the hollow center portion of filter 24 to outlet tube 21. It has been discovered that, as a result of the disc-shaped chamber, the velocity of the air swirling around the annular passage near the end of the annular passage is markedly increased. Consequently, the centrifugal force at this point is greater and more effective separation of dust particles ensues.

In a typical air cleaner in which filter 24 has a diameter of 8¾ inches and a height of 9⅝ inches, and main body 2 has a diameter of 12 inches, the dimensions a, b, and c indicated in FIG. 1 are ⅝ inch, 1 inch, and 2⅜ inches, respectively.

The mode of operation of the described air cleaner is independent of the effects of gravity. Although the air cleaner is shown in FIG. 1 in a vertical orientation, it can in use be mounted in any orientation including horizontally. The location of the intake and outlet tubes is also not material and could be reversed.

What is claimed is:

1. An air cleaner comprising:

a hollow, cylindrical housing open at its bottom and closed at its top by an end portion;

an inlet tube and an outlet tube extending from the outside of the housing and communicating with the inside of the housing, one of the tubes extending horizontally outward from the side of the housing and the other tube extending vertically outward from the end portion of the housing;

one end of the outlet tube facing in a downward direction inside the housing and having an annular flange;

a V-shaped bracket having two arms, the ends of which are attached to the end of the outlet tube such that the arms of the bracket converge downwardly from the tube symmetrically about the cylindrical axis of the housing;

a hollow, cylindrical skirt open at its bottom and partially closed at its top by an annular end portion, the skirt lying coaxial with the housing such that the annular end portion is in abutment with the annular flange;

a louvered ring integral with the skirt, the louvered ring extending around the outside perimeter of the skirt in abutment with the inside perimeter of the housing;

an annular air filter having an outside diameter substantially the same as the inside diameter of the cylindrical skirt and being substantially greater in height than the cylindrical skirt;

the air filter having a first cylindrical perforated sheet defining its outside surface and serving as a filter wall through which air to be filtered passes, a second cylindrical perforated sheet with a smaller diameter than the first sheet defining a cylindrical passage through the center of the filter and serving as a filter wall through which the filtered air passes, and a concave end cap covering the bottom of the filter;

a first annular gasket disposed around the annular flange;

the top of the filter lying within the cylindrical skirt against the first annular gasket to form a seal between the annular flange and the top of the filter and the V-shaped bracket extending through the cylindrical passage of the filter to the end cap;

a wing bolt securing the end cap of the filter to the V-shaped bracket;

a dust receptacle cup having cylindrical side walls with substantially the same diameter as the housing, an open top, and a closed bottom;

an insert having cylindrical side walls, an open top, and a closed concave bottom, the insert being located inside the dust receptacle so the bottom of the dust receptacle and the bottom of the insert define a chamber for dust;

the peripheral portion of the concave bottom of the insert having a single opening through which dust passes to the chamber;

a cap fixed to the dust receptacle in the chamber;

a wing bolt securing the bottom of the insert to the cap;

fastener rods mounted on the outside of the housing, each fastener rod being terminated in a wing nut;

brackets mounted on the outside of the dust receptacle, the fastener rods engaging the brackets so the top of the receptacle is fastened to the bottom of the housing;

the end cap of the filter being spaced from the bottom of the insert to form a disc-shaped chamber; and a second annular gasket lying between the top of the dust receptacle, the top of the insert, and the bottom of the housing to form a seal therebetween.

References Cited

UNITED STATES PATENTS

| | | | |
|---|---|---|---|
| 1,760,705 | 5/1930 | Ludlam | 55—337 X |
| 1,864,201 | 6/1932 | Kegerreis et al. | |
| 2,226,045 | 12/1940 | Baldwin | 55—508 X |
| 2,384,699 | 9/1945 | Russell et al. | 55—329 X |
| 2,825,425 | 3/1958 | Jacovelli et al. | 55—501 X |
| 2,973,830 | 3/1961 | Gruner | 55—337 |
| 3,078,650 | 2/1963 | Anderson et al. | 55—337 |
| 3,130,741 | 4/1964 | Vetere. | |
| 3,257,783 | 6/1966 | Baker et al. | |

FOREIGN PATENTS 1,278,115  10/1961  France.

OTHER REFERENCES

Netherlands printed application No. 286, 247 (B) printed February 1965 (copy in class 55 subclass 337).

HARRY B. THORNTON, *Primary Examiner.*

D. TALBERT, *Examiner.*